(12) United States Patent
DeLuca et al.

(10) Patent No.: US 8,339,360 B2
(45) Date of Patent: Dec. 25, 2012

(54) FLEXIBLE DISPLAY SECURITY CAPTCHA BENDS

(75) Inventors: Lisa Seacat DeLuca, San Francisco, CA (US); Lydia Mai Do, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 12/792,424

(22) Filed: Jun. 2, 2010

(65) Prior Publication Data

US 2011/0298691 A1   Dec. 8, 2011

(51) Int. Cl.
*G09G 5/00* (2006.01)
(52) U.S. Cl. ............................................ 345/156
(58) Field of Classification Search .............. 345/156, 345/76, 184, 173, 326, 358, 661
See application file for complete search history.

(56) References Cited

U.S. PATENT DOCUMENTS

| | | | |
|---|---|---|---|
| 6,268,857 B1 | 7/2001 | Fishkin et al. | 715/863 |
| 6,493,734 B1 | 12/2002 | Sachs et al. | 715/526 |
| 7,082,578 B1 | 7/2006 | Fishkin et al. | 715/863 |
| 7,342,569 B2 | 3/2008 | Liang et al. | 345/156 |
| 7,552,467 B2 * | 6/2009 | Lindsay | 726/5 |
| 2006/0238494 A1 | 10/2006 | Narayanaswami | 345/156 |
| 2009/0184921 A1 | 7/2009 | Scott et al. | 345/156 |
| 2009/0249476 A1 | 10/2009 | Seacat | 726/17 |
| 2009/0259588 A1 * | 10/2009 | Lindsay | 705/40 |
| 2009/0328150 A1 | 12/2009 | Gross | 726/3 |
| 2010/0011291 A1 | 1/2010 | Nurmi | 715/702 |
| 2010/0045705 A1 | 2/2010 | Vertegaal et al. | 345/661 |
| 2010/0053074 A1 | 3/2010 | Cohen et al. | 345/156 |

OTHER PUBLICATIONS

Pei et al., "Electroactive polymers for rigid-to-rigid actuation and Braille e-books," SPIE Newsroom: SPIE, Feb. 17, 2010.

* cited by examiner

*Primary Examiner* — Fred Tzeng
(74) *Attorney, Agent, or Firm* — Van Leeuwen & Van Leeuwen; Jeffrey S. LaBaw (57) ABSTRACT

An approach is provided that receives a request to perform an action by an information handling system that includes a processor. In response to the request, a captcha request that corresponds to a captcha is transmitted to a foldable display screen. A response is received from the foldable display screen with the response including one or more bends of the foldable display screen. The received one or more bends are compared to one or more expected bends included in the captcha. The requested action is performed in response to the comparison revealing that the received one or more bends match the one or more expected bends. On the other hand, performance of the requested action is inhibited in response to the comparison revealing that at least one of the received one or more bends fails to match at least one of the one or more expected bends.

20 Claims, 7 Drawing Sheets

FLEXIBLE DISPLAY SECURITY CAPTCHA BENDS

BACKGROUND

A captcha is a type of challenge-response test used in computing to ensure that the response is not generated by a computer. The process usually involves a computer asking a user to complete a simple test which the computer is able to generate and grade. Because other computers are unable to solve the captcha, any user entering a correct solution is presumed to be human. A common type of captcha requires that the user type letters or digits from a distorted image that appears on the screen.

SUMMARY

An approach is provided that receives a request to perform an action by an information handling system that includes a processor. In response to the request, a captcha request that corresponds to a captcha is transmitted to a foldable display screen. A response is received from the foldable display screen with the response including one or more bends of the foldable display screen. The received one or more bends are compared to one or more expected bends included in the captcha. The requested action is performed in response to the comparison revealing that the received one or more bends match the one or more expected bends. On the other hand, performance of the requested action is inhibited in response to the comparison revealing that at least one of the received one or more bends fails to match at least one of the one or more expected bends.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention.

Figure 1:
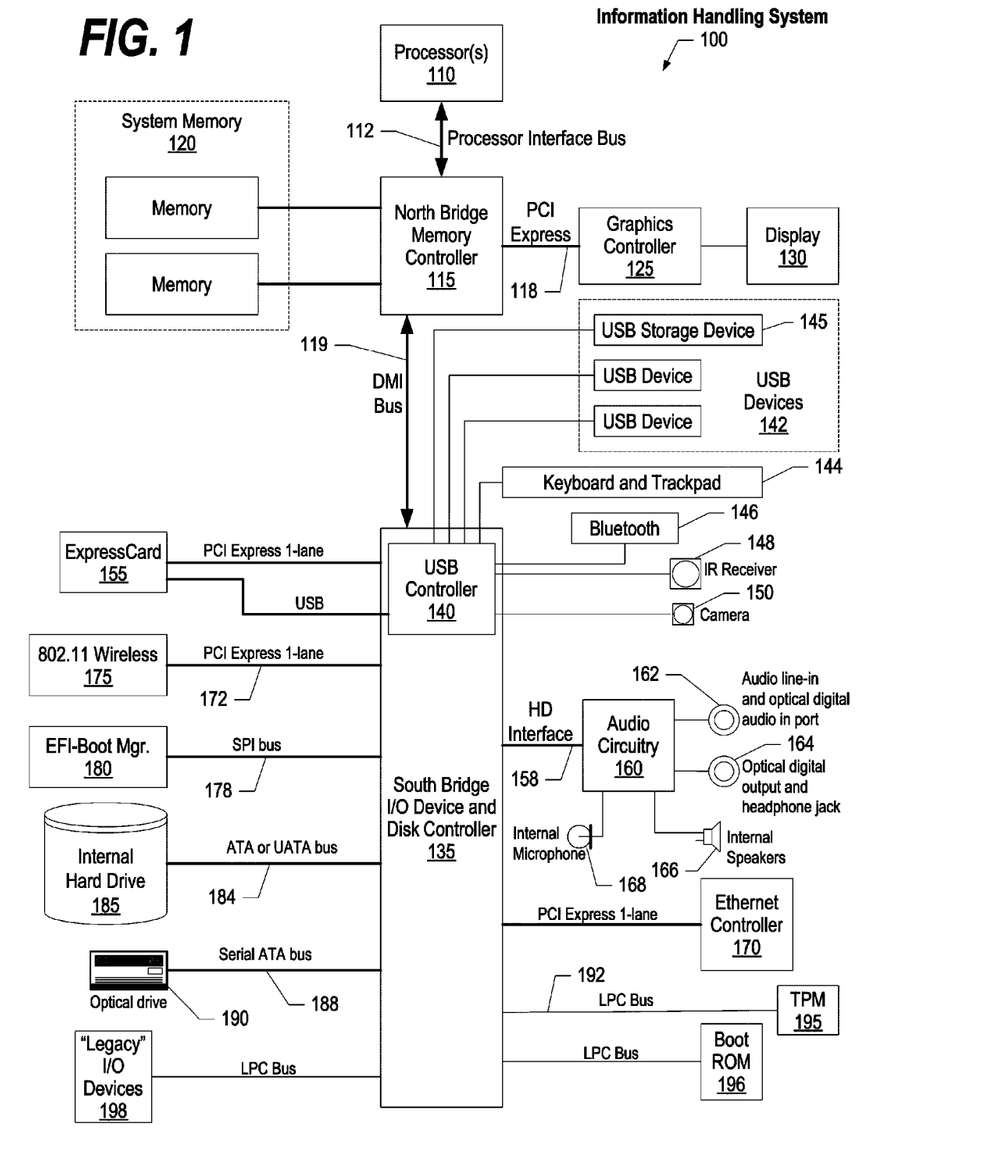
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, et cetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 2:
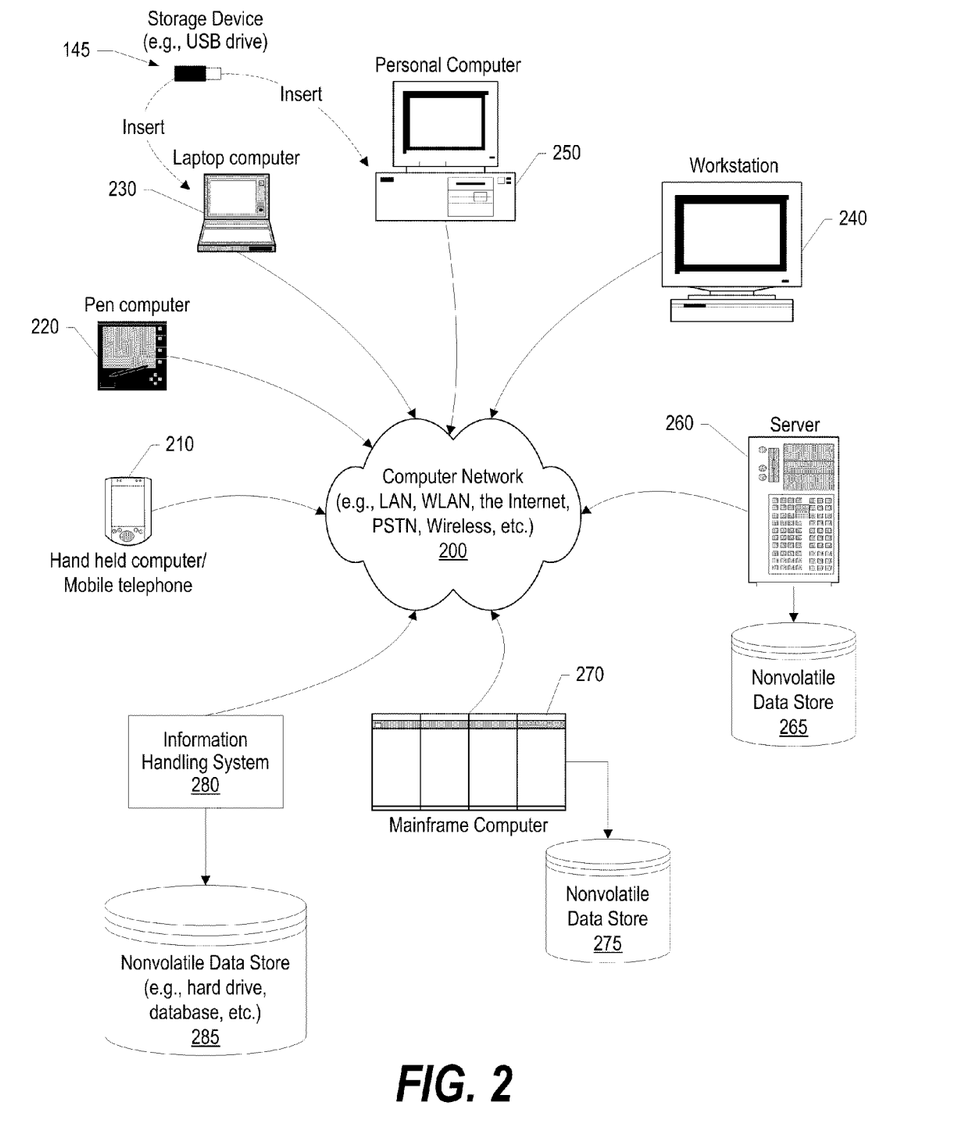
FIG. 2 is a network diagram of various types of data processing systems connected via a computer network.

FIG. 2 is a network diagram of various types of data processing systems connected via a computer network. FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
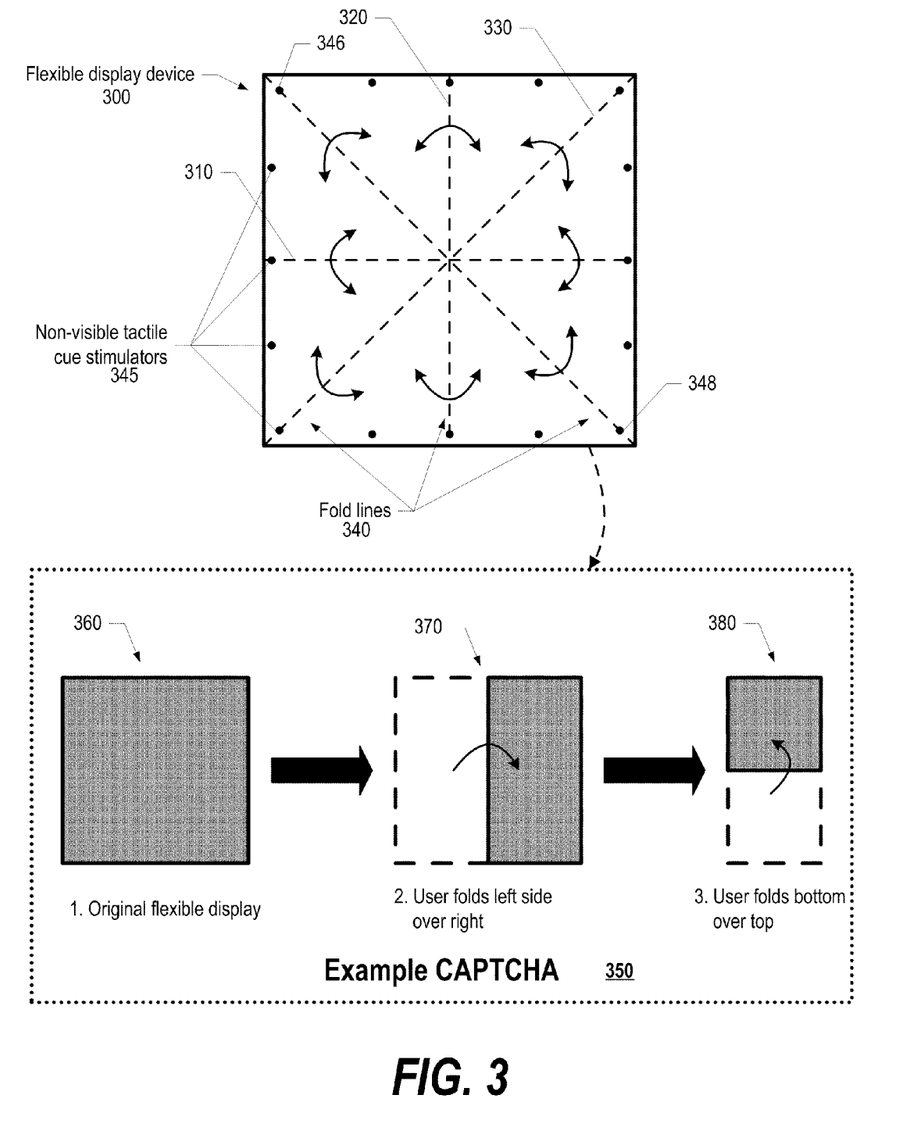
FIG. 3 is a depiction of a foldable display screen with fold lines and an example of folding the screen in a captcha.

FIG. 3 is a depiction of a foldable display screen with fold lines and an example of folding the screen in a captcha. The top of the figure shows flexible display screen 300 which can be folded in any number of directions including horizontally 310, vertically 320, and diagonally 330. Moreover, the foldable display screen can be displayed at other angles (e.g., at a 15 degree angle, etc.). In addition, the bends in the flexible display screen can be in either direction (e.g., with the sides moving toward the user or the sides moving away from the user, etc.). In one embodiment, fold lines 340 are provided as indicators of where the user is to fold the flexible display screen in order to comply with the captcha. In one embodiment, fold lines appear as graphic lines on flexible display screen. In another embodiment, the fold lines appear as tactile vibrations that indicate where the fold lines are positioned on the flexible display screen. This embodiment, which may be useful to users with various (e.g., visual) impairments or disabilities, may include or not include the visual fold lines. In a further embodiment, no fold lines are provided and the user is therefore required to remember where the bends are to be positioned in order to satisfy the captcha. This further embodiment may be useful when challenging a user to perform certain bends (e.g., unlock the system, etc.) that should be known by the primary user of the system (e.g., because the primary user established the bends, etc.).

In one embodiment, non-visible tactile cue stimulators 345 are located on flexible display device 300. In one embodiment, non-visible tactile cue stimulators are located at various places around the perimeter of flexible display screen 300 and are activated using an electric signal to two stimulators, one on each side of the display device. These non-visible tactile cue stimulators can be used by users with various visual impairments or disabilities to indicate where the user is to fold the display. For example, to indicate that a diagonal fold should be made from upper left to lower right, non-visible tactile cue stimulator 346 and its corresponding stimulator 348 on the opposite side of the display would be activated by sending an electric signal to these stimulators which cause a sensation (e.g., vibration, electric pulse, etc.) that can be felt by the user when the user runs his or her hands around the perimeter of display device 300. In an alternate embodiment, non-visible tactile cue stimulators are located on the backside of flexible display device (e.g., on the side of the display that does not display images and text). When the backside of the flexible display is used, the cue stimulators do not take away from the visible display area on display screen 300. In a further embodiment, electroactive polymers are used which are based on poly(tert-butylacrylate) (PTBA) which is a thermoplastic polymer that is rigid in ambient conditions. The PTBA-based cue stimulators are activated by applying an electric current to the stimulators which causes the stimulators to stretch (creating a bump) or not stretch (remaining flat) depending upon whether an electric current is applied to the stimulators. In this embodiment, electric current is induced to at least a pair of PTBA-based cue stimulators causing the stimulators to "bump" which provides a non-visible tactile cue that can be felt by users, such as those with a visual impairment or disability. A further embodiment uses miniaturized electro-mechanical non-visible tactile cue stimulators which provide a vibration on the surface of display screen 300 (see U.S. Publ. no. 2009/0259689, incorporated by reference herein in its entirety, for an example of such a miniaturized electro-mechanical stimulator).

An example captcha is provided in box 350. Original flexible display 360 is shown without any bends. The user is then prompted to perform a first fold (e.g., using a fold line or other prompt). In the example, the user correctly responds by folding the left side of the foldable display screen over the right side in view 370. Now, the foldable display screen would be folded in half. The user is then prompted to perform the final fold which is to bend the bottom half of the folded screen over the top of the screen in view 380. When the user performs the folds corresponding to the captcha, the requested action is performed. Requested actions can include a variety of different actions including unlocking a system, viewing a website or webpage provided by a remote system, accessing a program or function local to the user's system to which the foldable display screen is attached, or any other function either local or remote.

Figure 4:
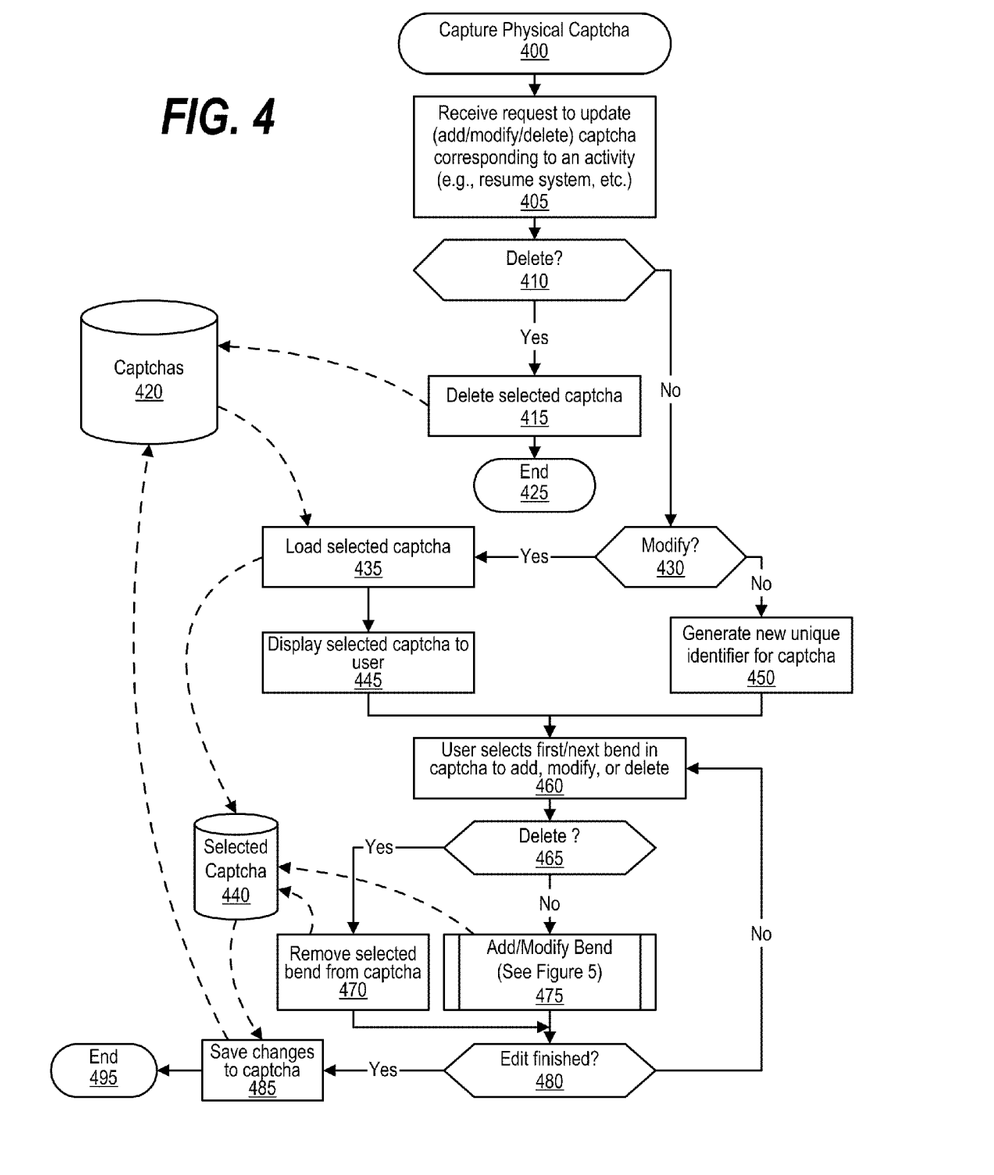
FIG. 4 is an exemplary flowchart diagram showing steps taken to capture a physical captcha for a foldable display screen.

FIG. 4 is an exemplary flowchart diagram showing steps taken to capture a physical captcha for a foldable display screen. Processing commences at 400 whereupon, at step 405, a request is received to update a captcha that corresponds to a particular activity. Updating can include adding, modifying, or deleting the captcha and a corresponding activity can include any computer performed activity that is to be performed in response to the user successfully performing the captcha (e.g., unlocking the system, resuming or booting the system, displaying a webpage, entering a website, etc.). A decision is made as to whether the request is to delete a captcha (decision 410). If the request is to delete a captcha, then decision 410 branches to the "yes" branch whereupon, at step 415, the selected captcha is deleted from captchas data store 420 and processing thereafter ends at 425. On the other hand, if the request was not to delete a captcha, then decision 410 branches to the "no" branch to continue processing.

A decision is made as to whether the request is to modify an existing captcha (decision 430). If the request is to delete an existing captcha, then decision 430 branches to the "yes" branch whereupon, at step 435, the selected captcha is loaded into selected captcha data store 440 and, at step 445, the selected captcha is displayed to the user. On the other hand, if the request was not to modify an existing captcha, then decision 430 branches to the "no" branch whereupon, at step 450, a new unique identifier is generated to correspond to the captcha that the user is about to create.

At step 460, the user selects the first bend in the captcha that the user wishes to update (add, delete, or modify). A decision is made as to whether the user has requested to delete the selected bend found in the captcha (decision 465). If the user has requested to delete the selected captcha, then decision 465 branches to the "yes" branch whereupon, at step 470, the selected bend is removed from the selected captcha. On the other hand, if the user has not requested to delete the selected bend, then decision 465 branches to the "no" branch whereupon the user adds or modifies a bend in the captcha (predefined process 475, see FIG. 5 and corresponding text for processing details).

A decision is made as to whether the user has finished editing the captcha (decision 480). If the user is not yet finished, then decision 480 branches to the "no" branch which loops back to receive the users next update request to add, modify, or delete a bend in the selected captcha. This looping continues until the user is finished editing the captcha, at which point decision 480 branches to the "yes" branch whereupon, at step 485, changes to the selected captcha are retrieved from selected captcha data store 440 and used to update the selected captcha stored in captchas data store 420. Processing thereafter ends at 495.

Figure 5:
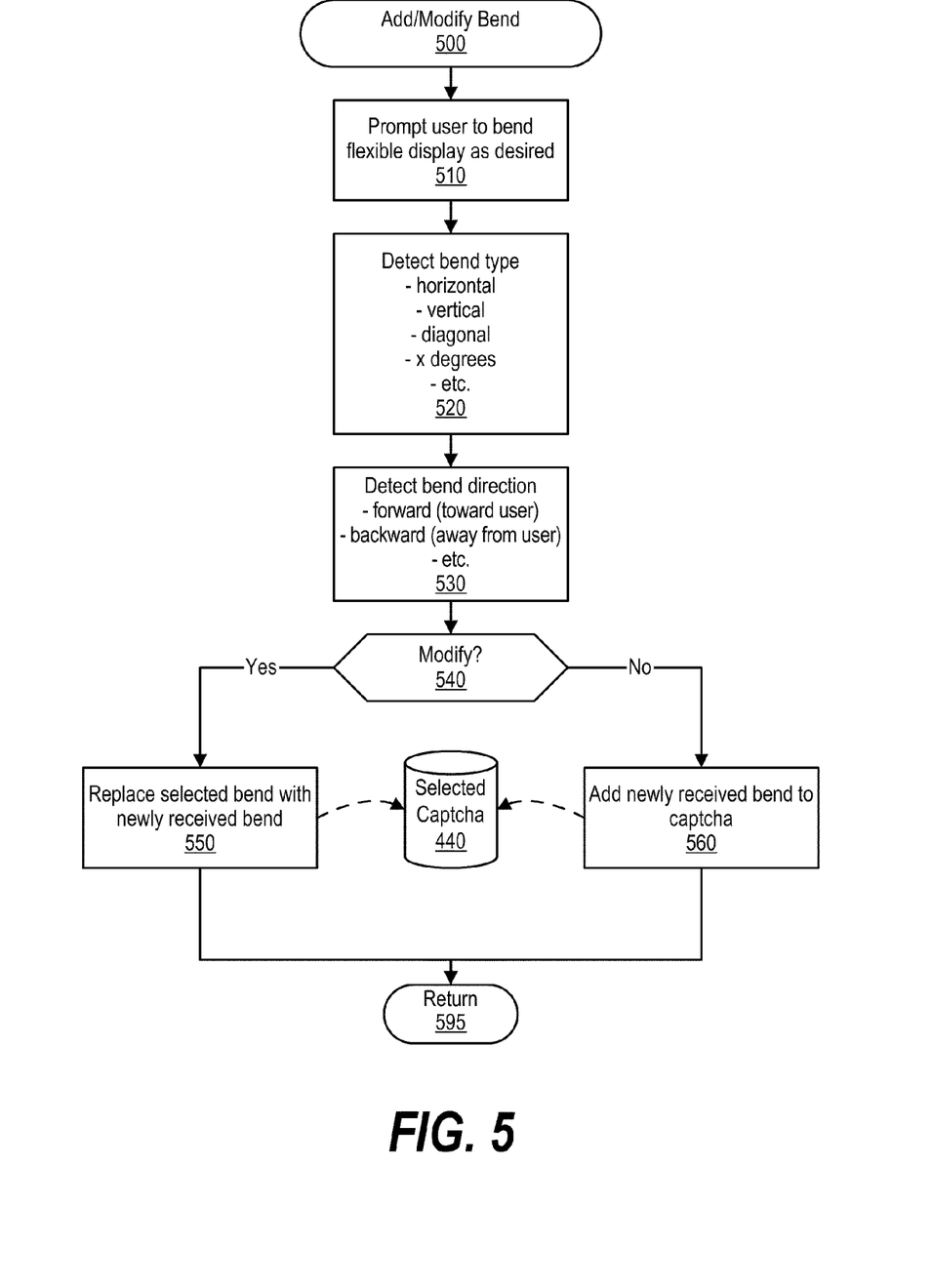
FIG. 5 is an exemplary flowchart diagram showing steps taken to add or modify a bend in a captcha using a foldable display screen.

FIG. 5 is an exemplary flowchart diagram showing steps taken to add or modify a bend in a captcha using a foldable display screen. This process is called from predefined process 475 found in FIG. 4. Processing of FIG. 5 commences at 500 whereupon, at step 510, the user is prompted to bend the flexible display screen to create an expected bend of the selected captcha. At step 520, the bend type is detected. As shown, the bend type can be at any foldable line of the foldable display screen (e.g., horizontal, vertical, diagonal, at a particular degree, such as 15 degrees, etc.). At step 530, the bend direction is detected (e.g., bent forward toward the user, bent backward away from the user, etc.). In one embodiment, both the bend type and the bend direction are included in the expected bend of the captcha.

A decision is made as to whether the user has requested to modify an existing bend of the selected captcha or to add a new bend to the captcha (decision 540). If the user has requested to modify an existing bend of the selected captcha, then decision 540 branches to the "yes" branch whereupon, at step 550, the selected expected bend of the captcha is replaced with the currently detected bend provided by the user (e.g., modifying a horizontal bend to a vertical bend, etc.). The modification is recorded in selected captcha data store 440. Returning to decision 540, if the user has requested to add the provided bend to the selected captcha, then decision 540 branches to the "no" branch whereupon, at step 560, the newly received bend is added to the selected captcha and stored in selected captcha data store 440. After the selected captcha is updated (with a modified or added bend), then processing returns to the calling routine (see FIG. 4) at 595.

Figure 6:
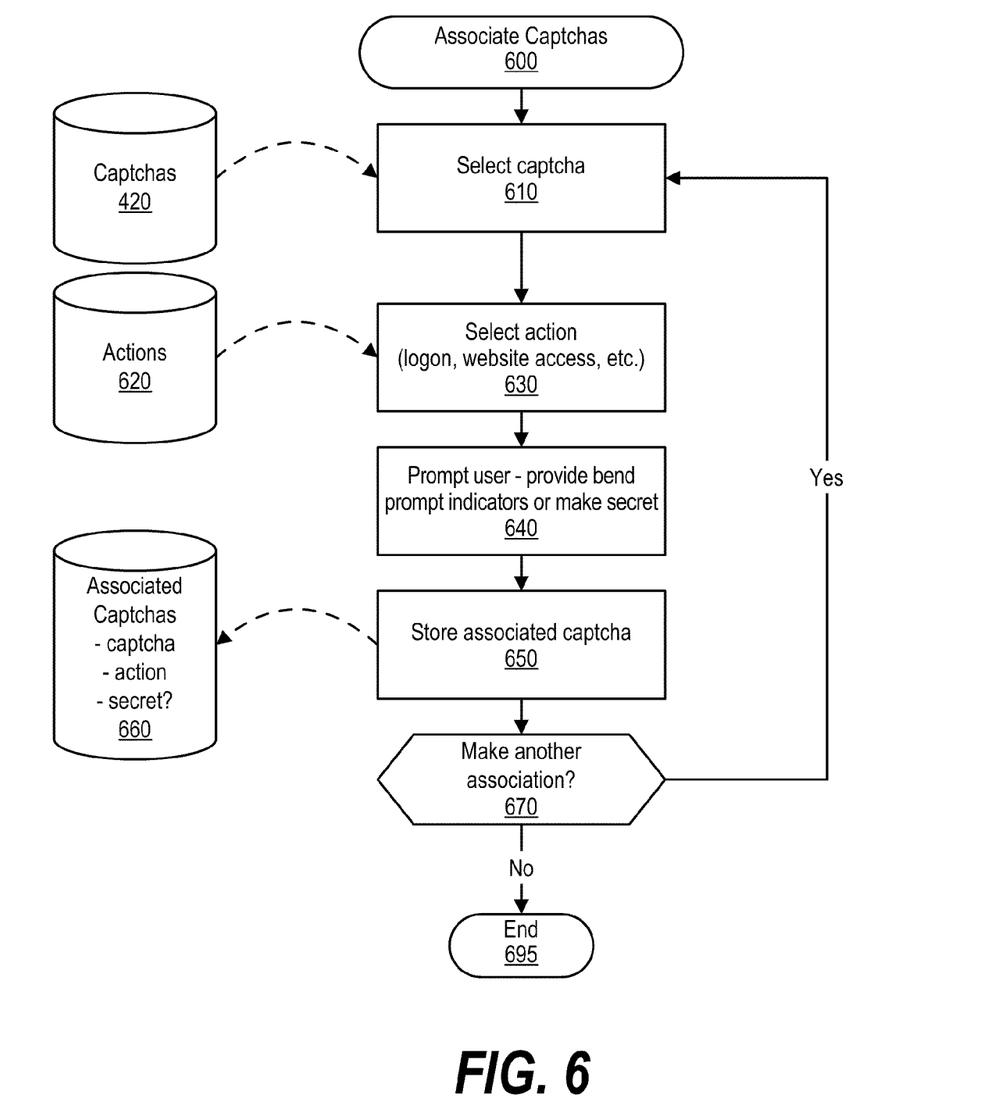
FIG. 6 is an exemplary flowchart diagram showing the association of stored captchas and actions taken on a computer system.

FIG. 6 is an exemplary flowchart diagram showing the association of stored captchas and actions taken on a computer system. Once captchas have been created and stored in captchas data store 420, the processing shown in FIG. 6 is used to associate the captchas with actions (e.g., unlocking the system, open a webpage, enter a website, etc.). Processing commences at 600 whereupon, at step 610, the user selects the captcha that is desired for association with an action. At step 630, an action is selected from actions data store 620. Actions can be essentially any action executable or provided by the information handling system. At step 640, the user is prompted as to whether the system will provide bend prompts (e.g., fold lines, etc.) to assist the user in performing the captcha. In one embodiment, prompts can include non-visual cues such as vibrating (visible or invisible) lines on the foldable display screen (e.g., to aid users with visual impairments or disabilities to perform the captcha, etc.). At step 650 the associated captcha is stored in associated captchas data store 660. As shown, the associated captchas data store includes the selected captcha (e.g., the captcha's unique identifier), the associated action (e.g., logon, view webpage, access website, etc.) and prompt information (e.g., "secret" captcha with no prompts, visible prompts, non-visible prompt cues, etc.). A decision is made as to whether the user desires to make another captcha-action association (decision 670). If the user desires to make more captcha-action associations, then decision 670 branches to the "yes" branch which loops back to receive the user's selections for the next association. This looping continues until the user does not desire to make further captcha-action associations at which point processing ends at 695.

Figure 7:
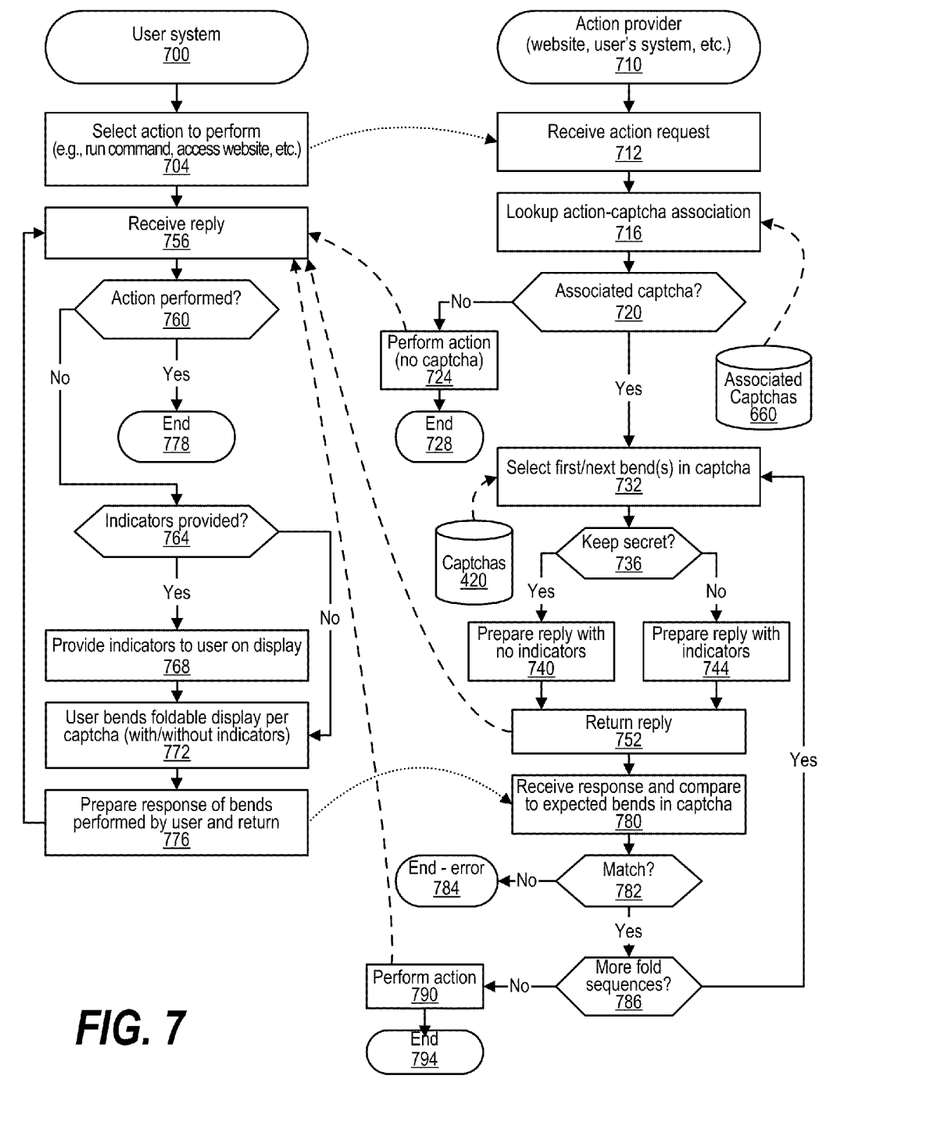
FIG. 7 is an exemplary flowchart diagram showing steps taken by a user and an action provider in using captchas before performing a desired action.

FIG. 7 is an exemplary flowchart diagram showing steps taken by a user and an action provider in using captchas before performing a desired action. Processing performed by the user (on the user's information handling system) commences at 700 whereupon, at step 704, the user selects an action to perform. Actions can be essentially any action performed on either the user's information handling system or on another information handling system, such as a web server that provides web pages and web sites. Action provider 710 receives the user's action request at step 712. The action provider can be either the user's information handling system or another information handling system depending upon the requested action. For example, if the requested action is to unlock the user's information handling system, then the action provider would be the user's information handling system. On the other hand, if the requested action was to open a webpage or enter a website, then the action provider would be the information handling system that hosts the webpage or website that is accessible via a computer network (e.g., the Internet) from the user's information handling system.

At step 716, the action provider searches associated captcha's data store 660 to determine whether there is a captcha that corresponds to the requested action. A decision is made as to whether the action has an associated captcha (decision 720). If the requested action does not have an associated captcha, then decision 720 branches to the "no" branch whereupon, at step 724, the action is performed as there was no associated captcha found for the action, and processing ends at 728. On the other hand, if an associated captcha was found, then decision 720 branches to the "yes" branch and processing continues.

At step 732, the first one or more bends in the associated captcha are selected from the captcha as stored in captchas data store 420. A decision is made as to whether the captcha is to be kept secret from the user based upon data stored in associated captchas data store 660 (decision 736). If the captcha is to be kept secret, then decision 736 branches to the "yes" branch whereupon, at step 740, the action provider prepares a reply to the user that does not include indicators that inform the user as to where the expected bends of the captcha are to be placed. On the other hand, if the captcha is not to be kept secret, then decision 736 branches to the "no" branch whereupon, at step 744, the action provider prepares a reply to the user that includes indicators that inform the user as to where the expected bends of the captcha are to be placed. In one embodiment, the indicators are visible lines that appear on the user's foldable display screen that inform the user where the bends are to be made on the foldable screen. In another embodiment, the indicators include non-visible cues such as vibrating lines (with or without the visible line indicators) that inform the user as to where the bends should be made on the foldable display screen. At step 752, the reply (with or without indicators) is returned to the user's system and the user is prompted to provide the expected bends corresponding to the associated captcha.

Returning to user processing, at step 756 the user receives the reply from the action provider. A decision is made as to whether the reply is the performance of the requested action indicating that no associated captcha was found (decision 760). If the action was not performed (indicating that an associated captcha was found), then decision 760 branches to the "no" branch whereupon a decision is made as to whether indicators (visible lines, non-visible cues, both, etc.) are provided (decision 764). If indicators are provided, then decision 764 branches to the "yes" branch whereupon, at step 768, fold lines corresponding to the expected bends in the captcha are provided on the foldable display screen (e.g., visibly, non-visibly using vibrations, etc.). On the other hand, if indicators are not provided, then decision 764 branches to the "no" branch bypassing step 768. At step 772, the user bends the foldable display screen in response to the captcha with or without the use of indicators (depending on whether the indicators were provided). At step 776, a response is prepared with the response including one or more bends performed by the user. A bend can include a positional value (e.g., horizontal, vertical, diagonal, etc.) as well as a directional value (e.g., folding towards the user, folding away from the user, etc.). This response is returned to the action provider at step 776. Processing used by the user loops back to step 756 to receive the reply from the action provider. If all of the bends of the captcha have been successfully provided by the user, the action provider will perform the action and decision 760 will branch to the "yes" branch whereupon user processing ends at 778. On the other hand, if the action provider requests additional bends for the associated captcha, then decision 760 with branch to the "no" branch and re-perform steps 764 through 776 to perform the next set of bends to the foldable display screen and send the response back to the action provider. This continues until the user has provided all of the bends required by the captcha or until one or more of the bends provided by the user do not match expected bends of the captcha, at which point the user will receive an error indicating that the captcha was performed incorrectly and the action will not be performed.

Returning to processing performed by the action provider, at step 780, the action provider receives the user's response and compares it to the expected bends in the captcha. A decision is made as to whether each of the bends provided by the user substantially match the expected bends found in the associated captcha (decision 782). If one or more of the bends performed by the user do not substantially match one or more of the expected bends found in the associated captcha, then decision 782 branches to the "no" branch whereupon processing ends with an error at 784 and the action provider inhibits performance of the requested action. On the other hand, if the bends provided by the user to the foldable display screen substantially match the expected bends found in the associated captcha, then decision 782 branches to the "yes" branch whereupon a decision is made as to whether there are additional folding sequences required by the captcha (decision 786). If there are additional folding sequences required by the captcha, then decision 786 branches to the "yes" branch which loops back to select the next set of one or more expected bends from the associated captcha and the selected set of bends is processed as described above. This looping continues until there are no more fold sequences to process, at which point (since the bends provided by the user have all substantially matched the expected bends), decision 786 branches to the "no" branch whereupon, at step 790 the requested action is performed by the action provider. Processing thereafter ends at 794.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A processor-implemented method comprising:
receiving a request to perform an action by an information handling system that includes the processor;
transmitting a captcha request to a foldable display screen, wherein the captcha request corresponds to a captcha;
receiving a set of responses from the foldable display screen, wherein each of the set of responses includes a bend of the foldable display screen;
retrieving a set of expected bends corresponding to the captcha;
comparing the set of received bends of the foldable display to the set of expected bends in order to determine whether the captcha was performed by a human user of the information handling system;
inhibiting performance of the requested action in response to the comparison revealing that at least one of the set of received bends fails to match at least one of the set of expected bends; and
performing the requested action in response to the comparison revealing that the set of received bends substantially matches the set of expected bends.

2. The method of claim 1 further comprising:
sending one or more indicators to the foldable display screen, wherein each of the indicators corresponds to one of the expected bends included in the captcha.

3. The method of claim 2 wherein the indicators are each visible fold line indicators that are displayed on the foldable display screen.

4. The method of claim 2 wherein the indicators are each non-visible tactile cues that indicate one or more positions of the one or more expected bends, the method further comprising:
triggering each of the non-visible tactile cues by sending a tactile signal to the foldable display screen at each of the one or more positions on the foldable display screen.

5. The method of claim 1 wherein the foldable display screen is connected to a second information handling system that communicates with the information handling system using a computer network, the method further comprising:
receiving the request at a network adapter that connects the information handling system to second information handling system via the computer network;
transmitting the captcha request to the second information handling via the computer network; and
receiving the response at the network adapter, wherein the response originated at the second information handling system.

6. The method of claim 1 further comprising:
selecting the captcha from a plurality of stored captchas, wherein the selected captcha is associated with the requested action.

7. The method of claim 1 wherein the foldable display screen is connected to the information handling system.

8. An information handling system comprising:
one or more processors;
a memory coupled to at least one of the processors;
a foldable display screen accessible by at least one of the processors; and
a set of instructions stored in the memory and executed by at least one of the processors in order to perform actions of:
sending a request to perform an action;
receiving a captcha request that corresponds to a captcha;
receiving a set of responses from a user of the foldable display screen, wherein the set of responses includes one or more bends of the foldable display screen;
retrieving a set of expected bends corresponding to the captcha;
comparing the set of received bends of the foldable display to the set of expected bends in order to determine whether the captcha was performed by a human user of the information handling system;
wherein performance of the requested action is inhibited in response to the comparison revealing that at least one of the set of received bends fails to match at least one of the set of expected bends; and
wherein the requested action is performed in response to the comparison revealing that the set of received bends substantially matches the set of expected bends.

9. The information handling system of claim 8 wherein the processors perform further actions comprising:
sending one or more indicators to the foldable display screen, wherein each of the indicators corresponds to one of the expected bends included in the captcha.

10. The information handling system of claim 9 wherein the indicators are each visible fold line indicators that are displayed on the foldable display screen.

11. The information handling system of claim 9 wherein the indicators are each non-visible tactile cues that indicate one or more positions of the one or more expected bends, and wherein the processors perform further actions comprising:
triggering each of the non-visible tactile cues by sending a tactile signal to the foldable display screen at each of the one or more positions on the foldable display screen.

12. The information handling system of claim 8 wherein the request is sent to a second information handling system that communicates with the information handling system using a computer network, the information handling system further comprising:
a network adapter that connects the information handling system to the computer network;
wherein the processors perform further actions comprising:
receiving the request at the network adapter that connects the information handling system to second information handling system via the computer network; and
transmitting the response received at the foldable display screen to the second information handling via the computer network, wherein the second computer system performs the requested action in response to the response received at the foldable display screen including one or more bends substantially matching the one or more expected bends.

13. The information handling system of claim 8 wherein the processors perform further actions comprising:
selecting the captcha from a plurality of captchas stored on a nonvolatile data store accessible from at least one of the processors, wherein the selected captcha is associated with the requested action.

14. A computer program product stored in a computer readable memory device, comprising functional descriptive material that, when executed by an information handling system, causes the information handling system to perform actions that include:
receiving a request to perform an action by an information handling system that includes the processor;
transmitting a captcha request to a foldable display screen, wherein the captcha request corresponds to a captcha;
receiving a set of responses from the foldable display screen, wherein each of the set of responses includes a bend of the foldable display screen;
retrieving a set of expected bends corresponding to the captcha;
comparing the set of received bends of the foldable display to the set of expected bends in order to determine whether the captcha was performed by a human user of the information handling system;
inhibiting performance of the requested action in response to the comparison revealing that at least one of the set of received bends fails to match at least one of the set of expected bends; and
performing the requested action in response to the comparison revealing that the set of received bends substantially matches the set of expected bends.

15. The computer program product of claim 14 wherein the actions further comprise:
sending one or more indicators to the foldable display screen, wherein each of the indicators corresponds to one of the expected bends included in the captcha.

16. The computer program product of claim 15 wherein the indicators are each visible fold line indicators that are displayed on the foldable display screen.

17. The computer program product of claim 15 wherein the indicators are each non-visible tactile cues that indicate one or more positions of the one or more expected bends, the computer program product further comprising:
triggering each of the non-visible tactile cues by sending a tactile signal to the foldable display screen at each of the one or more positions on the foldable display screen.

18. The computer program product of claim 14 wherein the foldable display screen is connected to a second information handling system that communicates with the information handling system using a computer network, and wherein the actions further comprise:
receiving the request at a network adapter that connects the information handling system to second information handling system via the computer network;
transmitting the captcha request to the second information handling via the computer network; and
receiving the response at the network adapter, wherein the response originated at the second information handling system.

19. The computer program product of claim 14 wherein the foldable display screen is connected to the information handling system.

20. The computer program product of claim 14 wherein the actions further comprise:
selecting the captcha from a plurality of stored captchas, wherein the selected captcha is associated with the requested action.

* * * * *